United States Patent
Dennis et al.

(10) Patent No.: US 9,093,862 B2
(45) Date of Patent: Jul. 28, 2015

(54) METHOD AND APPARATUS FOR CONTROLLING A HYBRID POWER SYSTEM

(75) Inventors: Kevin Dennis, Waukesha, WI (US); Michael Raasch, New Berlin, WI (US); Der Vang, Menomonee Falls, WI (US)

(73) Assignee: ZBB Energy Corporation, Menomonee Falls, WI (US)

( * ) Notice: Subject to any disclaimer, the term of this patent is extended or adjusted under 35 U.S.C. 154(b) by 921 days.

(21) Appl. No.: 13/185,862

(22) Filed: Jul. 19, 2011

(65) Prior Publication Data

US 2011/0273022 A1 Nov. 10, 2011

Related U.S. Application Data

(63) Continuation-in-part of application No. 12/355,169, filed on Jan. 16, 2009, now Pat. No. 8,008,808.

(51) Int. Cl.
*H02J 1/00* (2006.01)
*H02J 1/10* (2006.01)
(Continued)

(52) U.S. Cl.
CPC ... *H02J 1/10* (2013.01); *H02J 7/34* (2013.01); *H02J 3/382* (2013.01); *H02J 2001/104* (2013.01); *Y02E 10/563* (2013.01); *Y02E 10/566* (2013.01); *Y02E 10/763* (2013.01); *Y02E 10/766* (2013.01)

(58) Field of Classification Search
CPC .... H02J 1/10; H02J 2001/106; Y02E 10/563; Y02E 10/566; Y02E 10/763; Y02E 10/766
USPC ............................................. 307/82
See application file for complete search history.

(56) References Cited

U.S. PATENT DOCUMENTS

| 5,369,353 | A | 11/1994 | Erdman |
| 6,362,540 | B1 | 3/2002 | Hill |
| 6,674,263 | B2 | 1/2004 | Agbossou et al. |

(Continued)

FOREIGN PATENT DOCUMENTS

| JP | 2003339118 A | * 11/2003 |
| JP | 2006-129585 | 5/2006 |

(Continued)

OTHER PUBLICATIONS

International Search Report dated Jul. 9, 2010 for PCT/US2009/066574.

(Continued)

*Primary Examiner* — Daniel Cavallari
(74) *Attorney, Agent, or Firm* — Boyle Fredrickson, S.C.

(57) ABSTRACT

The present invention provides a simplified method of controlling power among the various sources and loads in a power system. Power generating sources are each connected to a common DC bus through a converter. The converter selectively transfers energy to the DC bus at a maximum rate or at a reduced rate according to the level of the DC voltage present on the DC bus. At least one storage device is preferably connected to the common DC bus through a power regulator. The power regulator selectively transfers energy to or from the DC bus as a function of DC voltage level present on the DC bus. Further, an inverter may be provided to bidirectionally convert between the DC voltage and an AC voltage for connection to a customer load or the utility grid. Each power conversion device is independently controlled to provide a modular and simplified power control system.

12 Claims, 12 Drawing Sheets

(51) Int. Cl.
*H02J 7/34* (2006.01)
*H02J 3/38* (2006.01)

(56) References Cited

U.S. PATENT DOCUMENTS

| | | | |
|---|---|---|---|
| 7,000,395 B2 | 2/2006 | Wai et al. | |
| 7,256,516 B2* | 8/2007 | Buchanan et al. | 307/62 |
| 7,393,604 B2 | 7/2008 | Rocke et al. | |
| 7,411,308 B2 | 8/2008 | Parmley | |
| 7,432,691 B2 | 10/2008 | Cutler | |
| 7,436,079 B2 | 10/2008 | Meyers et al. | |
| 7,986,122 B2* | 7/2011 | Fornage et al. | 320/101 |
| 2005/0200133 A1 | 9/2005 | Robben | |
| 2006/0066105 A1* | 3/2006 | Johnson et al. | 290/1 A |
| 2008/0129120 A1 | 6/2008 | Su et al. | |
| 2008/0143304 A1 | 6/2008 | Bose et al. | |
| 2009/0140577 A1 | 6/2009 | Fishman | |
| 2010/0009220 A1* | 1/2010 | Higdon | 429/13 |
| 2010/0219688 A1 | 9/2010 | Shyu et al. | |

FOREIGN PATENT DOCUMENTS

| | | |
|---|---|---|
| WO | 99/52193 A1 | 10/1999 |
| WO | 2009149518 A1 | 12/2009 |

OTHER PUBLICATIONS

International Search Report and the Written Opinion of the International Searching Authority, or the Declaration; International Application No. PCT/US2012/046996, mailed Jan. 29, 2013—(9 pages).

Notice of Preliminary Rejection from Korean Patent Office; Korean Patent Application No. 10-2014-7001170, dated Jan. 26, 2015—(5) pages.

English Translation of Notice of Preliminary Rejection from Korean Patent Office; Korean Patent Application No. 10-2014-7001170, dated Jan. 26, 2015—(4) pages.

\* cited by examiner

METHOD AND APPARATUS FOR CONTROLLING A HYBRID POWER SYSTEM

CROSS-REFERENCE TO RELATED APPLICATIONS

This application is a continuation-in-part of U.S. patent application Ser. No. 12/355,169, filed Jan. 16, 2009, now U.S. Pat. No. 8,008,808 the entire contents of which is incorporated herein by reference.

BACKGROUND OF THE INVENTION

1. Field of the Invention

The invention relates to a method and apparatus of controlling a hybrid power system. Specifically, this invention manages energy transfer and power flow among one or more power generating sources, storage devices, loads, the utility grid, an off grid power system, or a combination thereof, each of which is coupled to a common DC bus.

2. Discussion of the Related Art

In recent years, increased demands for energy and increased concerns about supplies of fossil fuels and their corresponding pollution have led to an increased interest in renewable energy sources. Two of the most common and best developed renewable energy sources are photovoltaic energy and wind energy. Other renewable energy sources may include fuel cells, hydroelectric energy, tidal energy, and biofuel or biomass generators. However, using renewable energy sources to generate electrical energy presents a new set of challenges.

One of the biggest challenges for connecting renewable energy sources to existing AC grids, whether the utility grid or an off-grid system, is that renewable energy sources often provide a variable supply of energy. The supply may vary, for example, according to the amount of wind, cloud cover, or time of day. Further, different energy sources provide different types of electrical energy. A wind turbine, for example, is better suited to provide Alternating Current (AC) energy with variable voltage and frequency while a photovoltaic cell is better suited to provide Direct Current (DC) energy. As a result, combining multiple sources of renewable energy with other generating systems, such as the utility grid, independent micro turbines and generators, or fuel cells into a single system with an AC and/or a DC output requires integration of each of these different energy sources.

The variable nature of the energy supplied by some renewable sources may also make it desirable to integrate an energy storage device in the power system. The energy storage device may be charged during periods of peak production by the renewable source or, alternately, by the utility grid or other generating source. The energy storage device may then deliver the stored energy to supplement the renewable source when the renewable source is generating less energy than is required by the loads in a system.

Prior attempts to integrate multiple sources of renewable energy typically require individually connecting each energy source as well as the storage device to a grid, where the grid may be either a stand-alone grid or the utility grid. Each manufacturer of a generating source, for example the wind turbine or the photovoltaic array, or load provides a power converter to connect the source or load to the grid. This approach typically results in an undesirable double power conversion, first converting the generating source to an AC voltage compatible with the utility grid and then back to a voltage compatible with the storage device.

In addition, attempts to integrate multiple sources typically require a high-level controller managing energy flow by each of the devices. The controller must manage multiple communications protocols and coordinate active and reactive power control between the various devices. For example, multiple AC sources operating in parallel in a grid-independent system typically require transfer switches and a control scheme to select desired generating sources, synchronize outputs, and/or balance loads. Such integration systems typically require complex software customized for each system. Addition of other generating sources or loads to the system requires subsequent modification of the integration software and connection hardware. Consequently, this complex control scheme limits the flexibility of integrating future generating sources or other modifications into a power system.

BRIEF DESCRIPTION OF THE INVENTION

Consistent with the foregoing and in accordance with the invention as embodied and broadly described herein, a method and apparatus for controlling a hybrid power system is described in suitable detail to enable one of ordinary skill in the art to make and use the invention.

The present invention provides a simplified method of controlling power and energy among the various sources and loads in a power system. Power generating sources are each connected to a common DC bus through a converter. The converter may selectively deliver maximum energy transfer to the DC bus or transfer energy at a reduced rate according to the level of the DC voltage present on the DC bus. At least one storage device is preferably connected to the common DC bus through a power regulator. The power regulator selectively transfers energy to or from the DC bus as a function of DC voltage level present on the DC bus. A DC to DC converter may be provided to supply DC voltage to a load at a DC voltage level different than the DC voltage level of the DC bus. Further, an inverter may be provided to convert the DC voltage to an AC voltage for a customer load or for connection to the utility grid. Each of the power conversion devices may be provided in many configurations according to the application requirements and is independently controlled to provide a modular and simplified power control system.

According to one embodiment of the invention, a power conversion device is provided between each generating source and a common DC bus. Each power conversion device converts electrical energy generated by the generating source according to a control algorithm optimized for the particular generating source independent of other sources or loads. For example, Maximum Power Point (MPP) tracking, as is known in the art, may be used on a converter connected to a photovoltaic array to provide maximum power or energy transfer from the generating source to the common DC bus. A storage device and a power regulator, connecting the storage device to the common DC bus, are also provided. When power in excess of that required by the loads connected to the system is being generated, the storage device charges until it reaches maximum capacity. If the power demand by the loads exceeds the power being generated in the system, the storage device discharges to meet the extra demand. The power regulator monitors the voltage level on the DC bus as an indicator to determine whether the supply exceeds the demand or whether the demand exceeds the supply. In addition, if the power system includes a grid-independent AC load or is connected to the utility grid, an inverter is provided between the common DC bus and the AC system. The inverter controller is capable of providing bidirectional power flow such that excess energy generated by the sources may be supplied to the utility grid when the power generated exceeds the power demanded. Similarly, energy may be drawn from the utility grid when the power generated by the sources fails to meet the power demanded by the power system According to another embodiment of the invention, a controller for a hybrid power system includes at least one energy converter. Each energy converter is electrically coupled to an electrical energy generating device. The apparatus includes at least one energy storage device. An energy regulator is electrically coupled to the energy storage devices. A DC bus is then electrically coupled to each of the energy converters and the energy regulator. The energy regulator includes a first voltage signal indicating the value of a DC voltage present on the DC bus and a first control unit which maintains the DC voltage within a preset range having a low voltage setpoint and a high voltage setpoint.

As another aspect of the invention, the power controller may further utilize a voltage signal indicating the value of the DC voltage present on the DC bus and a second control unit configured to disable power flow from the electrical energy generating devices when the DC voltage reaches a predetermined maximum value. An inverter may be electrically coupled to the DC bus to convert the DC voltage to an AC voltage. The inverter may supply power to an AC load independent of a utility grid or in cooperation with the utility grid. The AC voltage generated from the inverter may be connected to the utility grid, to an AC load, or to a combination of the grid and the AC load. The inverter may further provide bidirectional power flow between the DC bus and the utility grid or an AC load. Optionally, multiple inverters may be provided which separately connect to an AC load and to the utility grid.

It is yet another aspect of the invention that the power converters and regulators are modular. The independent nature of the power conversion devices allows converters to be added or removed without requiring modifications to the control units of other converters or the regulator. For example, a DC load may be coupled to the common DC bus such that the power system may supply power to either a DC or an AC load. The DC load may be coupled either directly or using a DC to DC converter if a voltage other than the DC bus voltage is desired. At least one additional energy converter coupled to an additional electrical energy generating device may be coupled to the common DC bus without modifying any of the existing energy converters or the energy regulator.

According to yet another embodiment of the invention, a power control system for managing energy transfer includes a common DC bus, a plurality of energy storage devices, and a plurality of energy regulators. Each energy regulator has a first connection electrically coupled to at least one of the energy storage devices and a second connection electrically coupled to the common DC bus. Each energy regulator further includes a plurality of switches, a voltage signal corresponding to an amplitude of a DC voltage present on the DC bus, a memory device, and a processor. Each switch is selectively energized according to a switching signal to control energy transfer between the first and the second connections. The memory device stores at least a control program, a low voltage setpoint, and a high voltage setpoint. The processor executes the control program to generate the switching signals for each of the plurality of switches as a function of the voltage signal, the low voltage setpoint, and the high voltage setpoint. Energy is transferred from the common DC bus to the energy storage devices if the voltage signal is greater than the high voltage setpoint, and energy is transferred from the energy storage devices to the common DC bus if the voltage signal is less than the low voltage setpoint.

As another aspect of the invention, the power control system may include at least a first and a second energy storage device and at least a first and a second energy regulator corresponding to each of the first and the second energy storage devices, respectively. One of the low voltage setpoint and the high voltage setpoint of the first energy regulator may be set to a different value than the respective low voltage setpoint or high voltage setpoint of the second energy regulator. The first energy storage device may be of different construction than the second energy storage device, and each of the low voltage setpoint and the high voltage setpoint for both the first energy regulator and the second energy regulator is a function of the construction of the first energy storage device and the second energy storage device, respectively.

According to still another aspect of the invention a central controller is in communication with each of the energy regulators. The central controller has a processor configured to execute a stored program and a memory device storing at least the program and a copy of each of the voltage setpoints for the energy regulators. The central controller is configured to periodically execute the stored program on the processor to exchange the low voltage setpoint and the high voltage setpoint of a first energy regulator with the low voltage setpoint and the high voltage setpoint of a second energy regulator. The central controller is further configured to periodically execute the stored program on the processor to discharge one or more of the energy storage devices. A new value is loaded into each of the low voltage setpoint and the high voltage setpoint of a first of the energy regulators such that each of the new values is greater than the high voltage setpoint of each of the other energy regulators. The central controller receives a signal corresponding to the energy storage device being discharged, and resets the value of each of the low voltage setpoint and the high voltage setpoint of the first energy regulator to their original operating value. Further, a schedule may be established to periodically discharge each of the energy storage devices on a rotating basis. Thus, only one of the energy storage devices is being discharged while the remaining devices may continue to transfer energy to or from the DC bus.

According to yet another aspect of the invention, the power control system may further include at least one energy converter having an input electrically coupled to a power generating source and an output electrically coupled to the common DC bus. Each energy converter includes a plurality of switches, a voltage signal corresponding to the amplitude of the DC voltage present on the DC bus, a memory device, and a processor. Each switch is selectively energized according to a switching signal to control energy transfer between the input and the output. The memory device stores at least a control program and a mode select setpoint, and the processor executes the control program to generate the switching signals as a function of the voltage signal and the mode select setpoint. In the first operating mode, the DC voltage signal is less than the mode select setpoint and a maximum amount of energy generated by the source is transferred to the DC bus. In the second operating mode, the DC voltage signal is greater than the mode select setpoint and energy generated by the source is transferred to the DC bus at a reduced rate. The rate at which energy is transferred to the DC bus is a function of the difference between the voltage signal and the mode select setpoint.

According to yet another embodiment of the invention, a method for managing energy transfer between a plurality of energy storage devices connected by a common DC bus includes connecting a plurality of energy regulators to the common DC bus. Each energy regulator has a first connection electrically coupled to at least one of the energy storage devices and a second connection electrically coupled to the common DC bus. A signal corresponding to an amplitude of a DC voltage present on the common DC bus is received at a processor executing in each energy regulator, and the DC voltage signal is compared to a low voltage setpoint and a high voltage setpoint stored in a memory device in the energy regulator. Energy is transferred between each energy regulator and the DC bus independently of the other energy regulators. Each energy regulator transfers energy from the common DC bus to the connected energy storage device if the DC voltage signal is greater than the high voltage setpoint and from the connected energy storage device to the common DC bus if the voltage signal is less than the low voltage setpoint.

According to still another embodiment of the invention, a power control system for managing energy transfer between at least one energy source and at least one load includes a common DC bus and at least one energy converter. The energy converter includes an input electrically coupled to one of the energy sources, an output electrically coupled to the common DC bus, and a voltage signal corresponding to an amplitude of the voltage present on the common DC bus. Each energy converter is configured to transfer energy from the energy source to the common DC bus as a function of the voltage signal. The power control system also includes an inverter which includes a first connection electrically coupled to the common DC bus, a second connection connected to a utility grid, and a voltage signal corresponding to an amplitude of the voltage present on the common DC bus. The inverter is configured to selectively transfer energy bidirectionally between the common DC bus and the utility grid as a function of the voltage signal, a high voltage setpoint, and a low voltage setpoint.

As another aspect of the invention, the power control system may include at least one energy storage device and at least one energy regulator. The energy regulator includes a first connection electrically coupled to at least one of the energy storage devices, a second connection electrically coupled to the common DC bus, and a voltage signal corresponding to an amplitude of the voltage present on the common DC bus. The energy regulator is configured to selectively transfer energy bidirectionally between the common DC bus and the energy storage device as a function of the voltage signal, a low voltage setpoint, and a high voltage setpoint. The power control system may also include a central interface storing a copy of each of the setpoints which has a user interface to permit an operator to configure each of the setpoints. The central interface includes a processor configured to execute a stored program to periodically reconfigure at least one of the setpoints.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Preferred exemplary embodiments of the invention are illustrated in the accompanying drawings in which like reference numerals represent like parts throughout, and in which.

Figure 1:
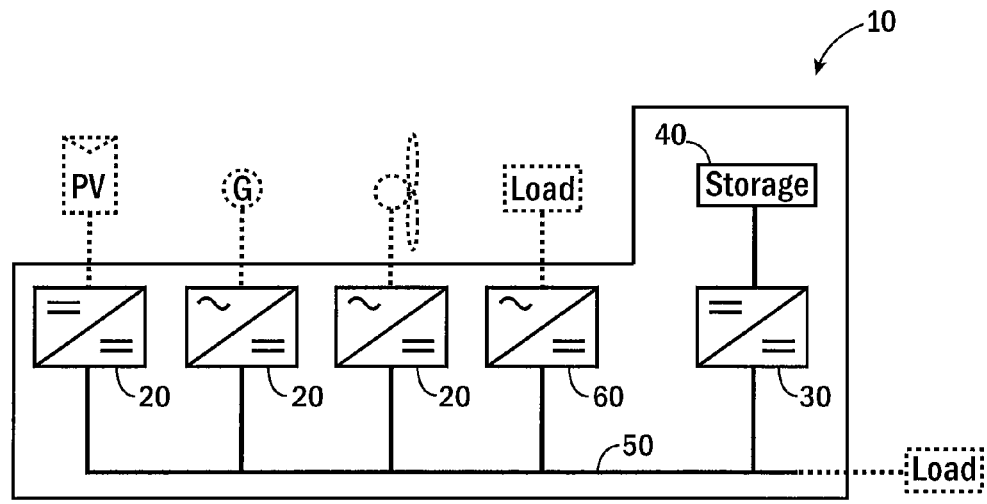
FIG. 1 is a schematic representation of a first embodiment of the present invention illustrating exemplary generating sources and loads.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The present invention provides a method and apparatus of controlling a hybrid power system 10. Specifically, this invention manages power flow or energy transfer among one or more power generating sources, storage devices, loads, and the utility grid, each of which is coupled to a common DC bus 50, either directly or by a power conversion device.

Figure 4:
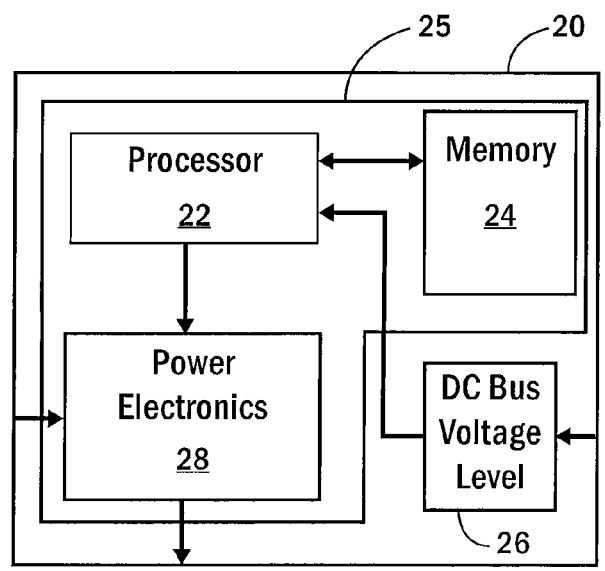
FIG. 4 is a schematic representation of an exemplary converter.
Figure 5:
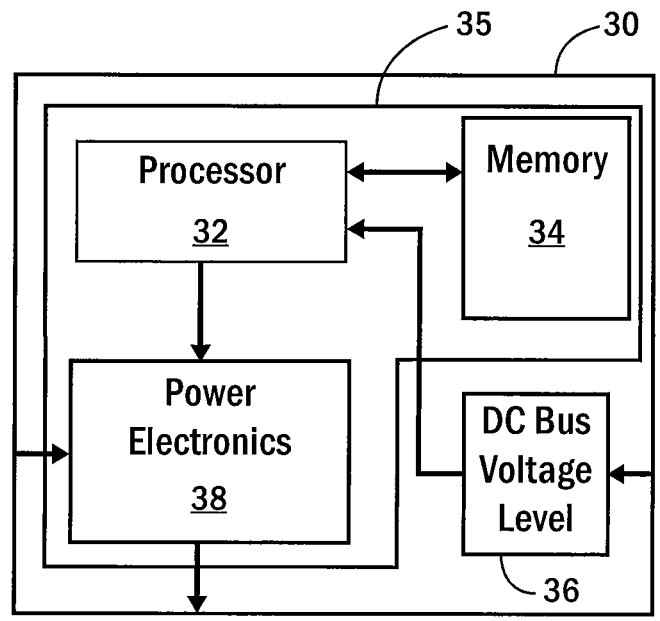
FIG. 5 is a schematic representation of an exemplary regulator.
Figure 6:
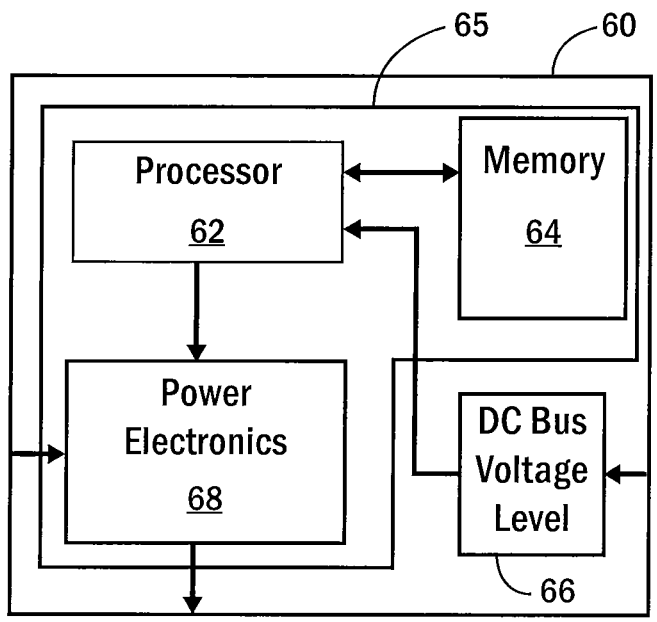
FIG. 6 is a schematic representation of an exemplary inverter.

Throughout this description, several terms will be used for describing the power conversion devices used to couple a generating source or load to the common DC bus 50, including: a converter 20, a regulator 30, and an inverter 60. Referring to FIGS. 4-6, each of the converter 20, regulator 30, and inverter 60 include both a voltage signal 26, 36, 66 and a control unit 25, 35, 65. The voltage signal 26, 36, 66 indicates the voltage level present on the DC bus 50 and may be generated by individual voltage sensors within each power conversion device, a single voltage sensor providing the signal to multiple power conversion devices, or a combination of voltage sensors providing a signal to individual power conversion devices and to multiple power conversion devices. The control unit 25, 35, 65 of each power conversion device preferably includes a power conversion section, consisting of power electronic devices 28, 38, 68, a processor 22, 32, 62 capable of executing a program to send control signals to the power electronic devices 28, 38, 68, and memory 24, 34, 64 for storing the program capable of executing on the processor 22, 32, 62. The voltage signal 26, 36, 66 is read by the program executing on the processor 22, 32, 62. The program outputs control signals to the power electronic devices 28, 38, 68 to regulate power flow through the device as described in more detail below. Alternately, the control unit 25, 35, 65 may be made up solely of the power electronic devices 28, 38, 68 and control hardware connected directly to the voltage signal 26, 36, 66 to regulate power flow through the device. For example, a boost converter, as is known in the art, may be used to convert a first DC voltage level to a higher, second DC voltage level.

Referring to FIG. 1, a first embodiment of the hybrid power system 10 is illustrated. The power system 10 includes at least one converter 20, each converter 20 is connected to a generating source. The power system 10 further includes at least one regulator 30, each regulator 30 connected to at least one storage device 40. A common DC bus 50 links each of the converters 20 and the regulators 30 together.

Each converter 20 is electrically coupled between a generating source and the common DC bus 50. The generating source may be of any type known in the art, including but not limited to wind, photovoltaic, hydroelectric, fuel cell, tidal, biofuel or biomass generating sources. Each of these sources generates power which is output as either an AC or a DC voltage with an amplitude suited to the type of generating source. The voltage output from the generating source is provided as an input voltage to the power electronics 28 of the converter 20. The power electronics 28 are configured to convert the voltage from the source to a desired DC voltage level as an output voltage to the DC bus 50. For example, the desired DC voltage level may be 650 volts if the power system connects to a 460 volt utility grid. Alternately, the DC voltage level may be any desired DC voltage, such as 48 volts, that may be required by a specific DC load. The DC voltage level may be allowed to vary within a preset range and selected to provide optimum energy conversion between a generating source and the DC bus 50.

Figure 10:
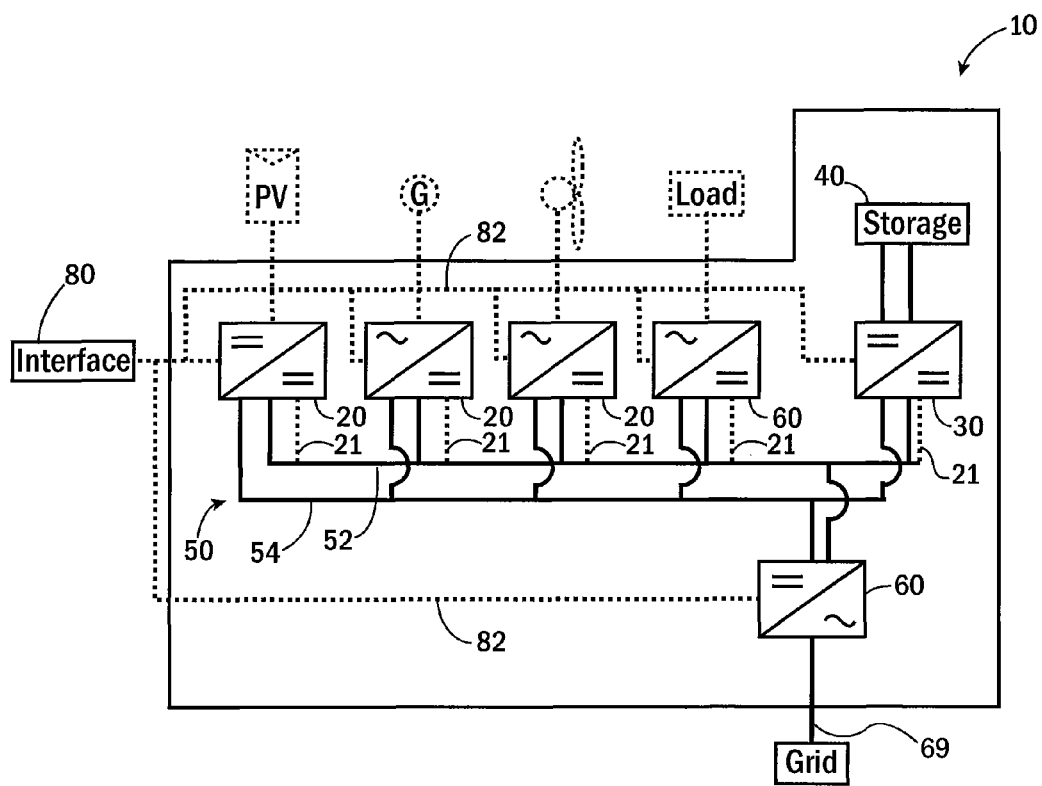
FIG. 10 is a schematic representation of another embodiment of the present invention illustrating exemplary generating sources and loads connected to a single potential DC bus.
Figure 11:
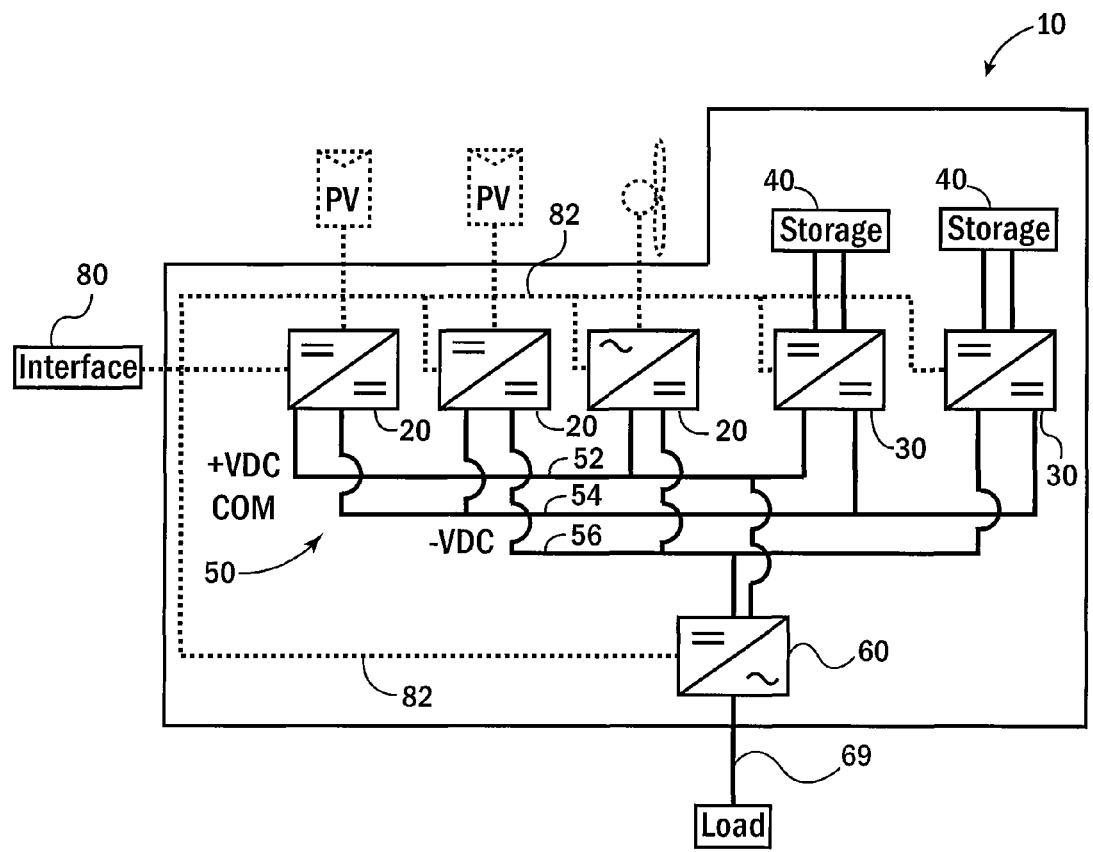
FIG. 11 is a schematic representation of another embodiment of the present invention illustrating exemplary generating sources and loads connected to a split potential DC bus.

Referring also to FIGS. 10 and 11, the common DC bus 50 may be either a single level or a multi-level DC bus. A single level bus includes a first DC rail 52 and a second DC rail 54. Each DC rail may be, but is not limited to, a single terminal, multiple terminals connected by suitable electrical conductors, or a bus bar. The single level bus establishes one voltage potential between the first and second DC rails, 52 and 54 respectively. A multi-level DC bus, includes the first and second DC rails, 52 and 54 respectively, and further includes at least a third DC rail 56. The multi-level DC bus establishes at least two different voltage potentials between the DC rails. For example, a multi-level DC bus may include a first DC rail 52 at a positive voltage potential such as 325 volts, a second DC rail 54 at a neutral voltage potential, and a third DC rail 56 at a negative voltage potential such as −325 volts. The net voltage potential between the first and the third DC rails, 52 and 56 respectively, is twice the voltage potential, or 650 volts, as the potential between either of the first or third DC rails, 52 and 56 respectively, and the neutral second DC rail 54. Thus, three different voltage potentials exist on the DC bus 50 illustrated in FIG. 11. As further illustrated in FIG. 11, each converter 20, regulator 30, and inverter 60 may connect to any of the three voltage potentials according to the requirements of the source, storage device 40, or load connected to the respective power conversion device.

Each regulator 30 is electrically coupled between at least one storage device 40 and the common DC bus 50. The hybrid power system 10 may include one or more storage device 40 according to the application requirements. The storage device 40 stores energy and may provide either a DC or AC voltage. For example, the storage device 40 may be, but is not limited to, a battery, a fuel cell, a flow battery, or a flywheel. It is contemplated that each storage device 40 may be made of either a single device or multiple devices connected in series, parallel, or a combination thereof as is known in the art. The power electronics 38 of each regulator 30 are configured to allow bidirectional power flow between the DC bus 50 and the storage device 40. The DC bus 50 operates at a first DC voltage level and the storage device 40 operates at a second DC voltage level. Alternately, the DC bus 50 and the storage device 40 may operate at the same DC voltage level.

Figure 2:
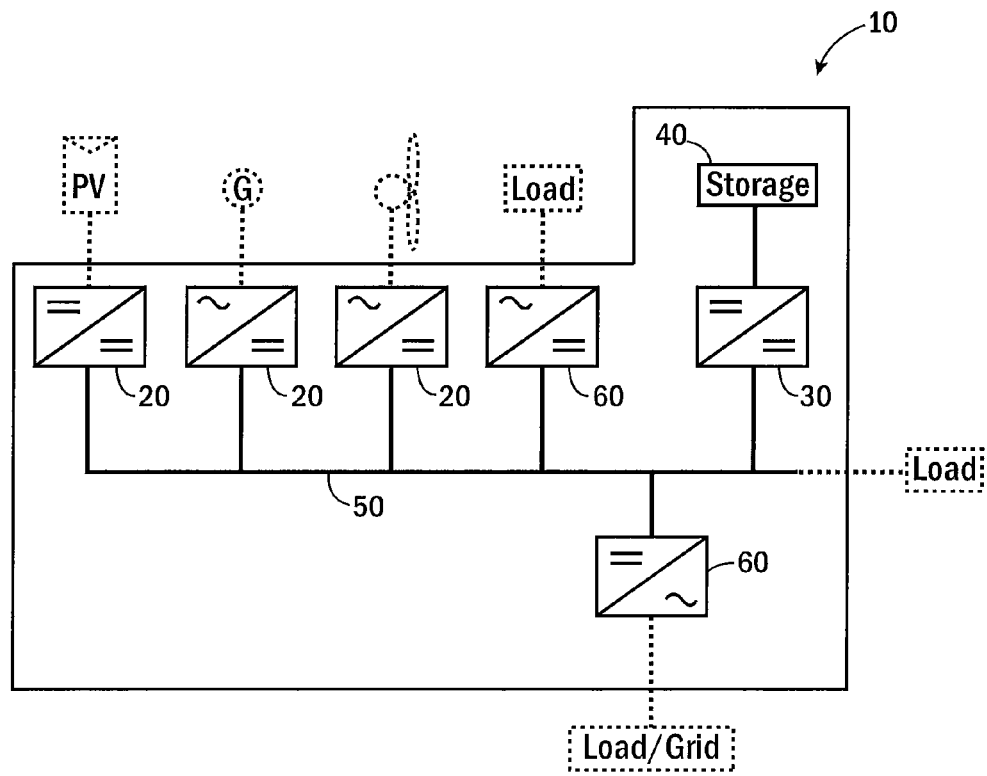
FIG. 2 is a schematic representation of another embodiment of the present invention illustrating exemplary generating sources and loads and further illustrating a connection to an AC customer load or utility grid.
Figure 3:
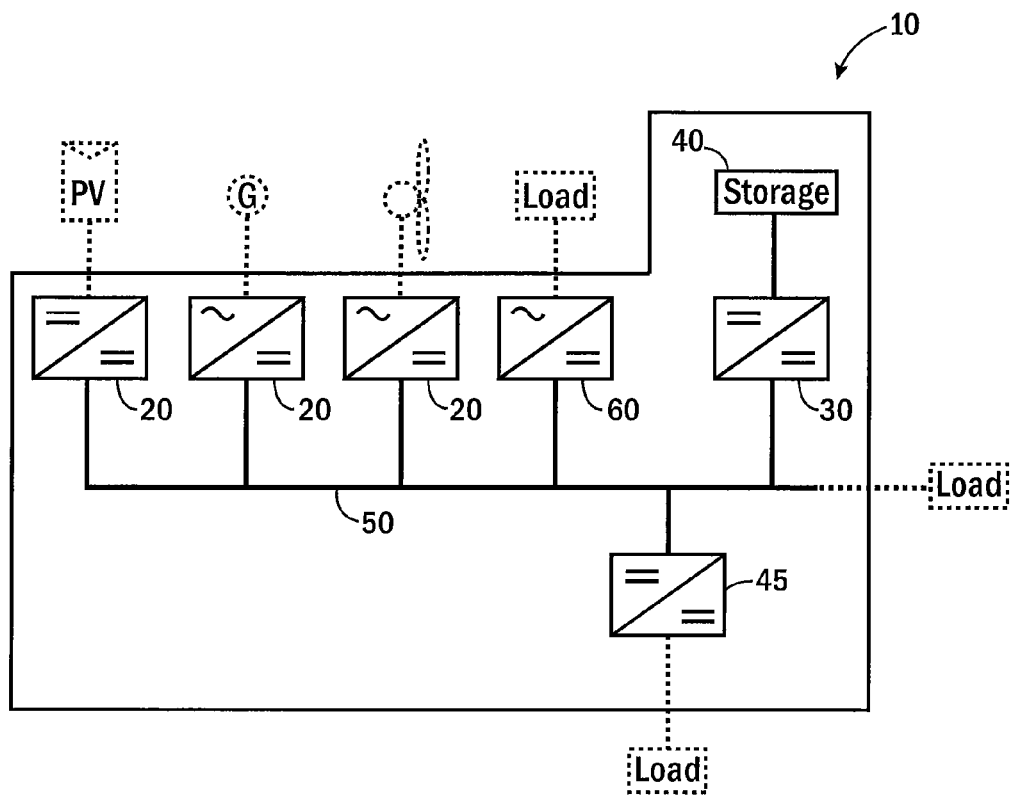
FIG. 3 is a schematic representation of another embodiment of the present invention illustrating exemplary generating sources and loads and further illustrating a connection to an DC customer load at a different DC voltage than the DC bus.

Referring next to FIGS. 2 and 3, the hybrid power system 10 may further include an output power conversion device, for example an inverter 60 or another DC-to-DC converter 45. Referring also to FIGS. 10-13, the inverter 60 may be electrically coupled between the DC bus 50 and an electrical connection 69 to the utility grid, an AC load, or both an AC load and the utility grid. The power electronics 68 of each inverter 60 may be configured to allow bidirectional power flow between the DC bus 50 and the AC load or the grid. The bidirectional power flow allows the utility grid, when connected, to supply power to the DC bus 50, supplementing the power provided by the generating sources if the demand from the loads connected to the power system exceed the power supplied by the generating sources. The DC-to-DC converter 45 is electrically coupled between the DC bus 50 and a DC load operating at a different voltage level than the voltage on the DC bus 50. It is contemplated that any number and combination of loads may be connected to the system, such that a load may be connected to the DC bus 50 either directly, through the inverter 60, through the DC-to-DC converter 45, or any combination or multiple thereof.

Figure 13:
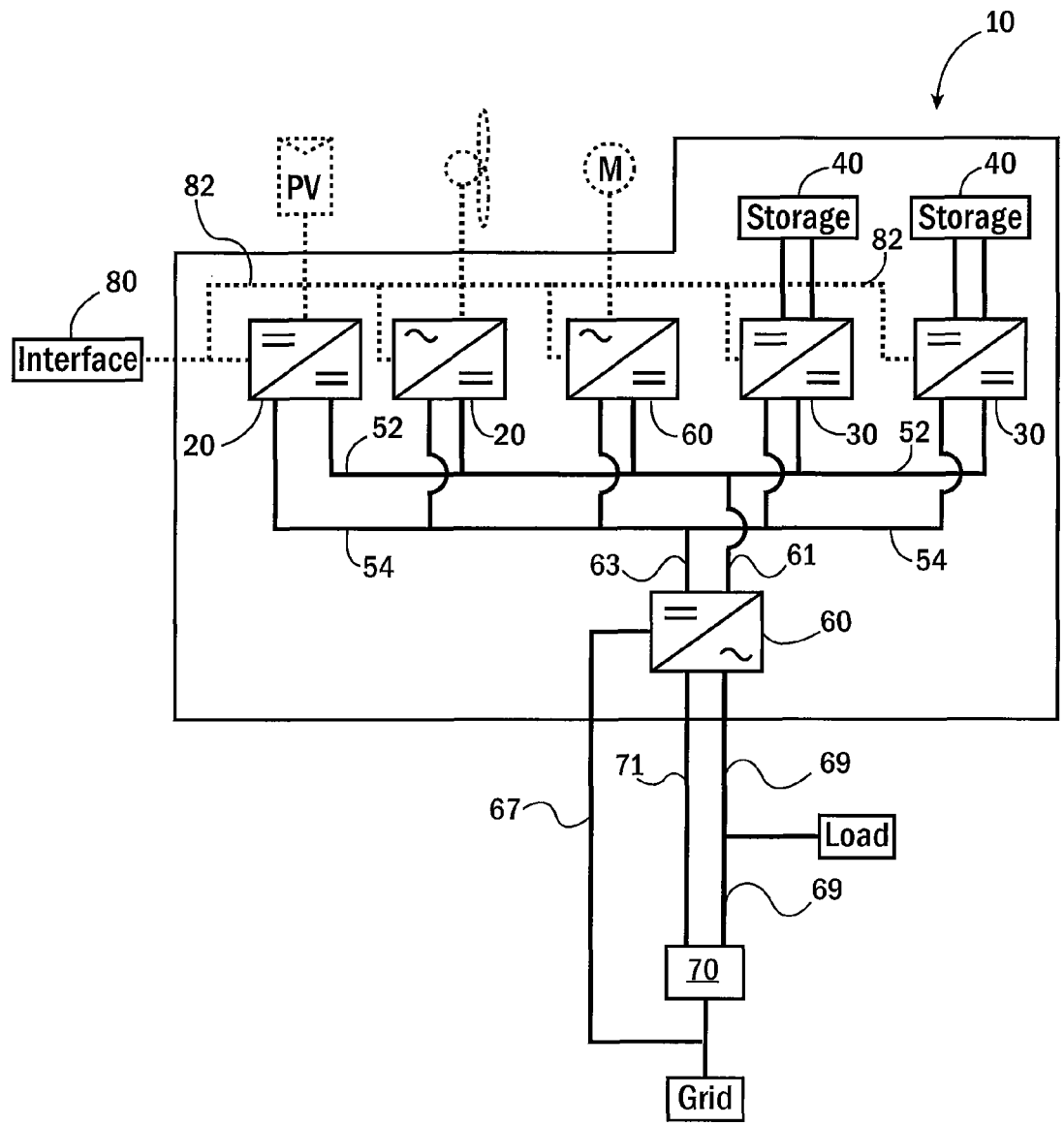
FIG. 13 is a schematic representation of another embodiment of the present invention illustrating exemplary generating sources and loads connected to an AC load and utility grid.

Referring to FIG. 13, a grid disconnect switch 70 may be included to disconnect the hybrid power system 10 from the grid, for example during a power outage, and allow the hybrid power system 10 to continue operating in a stand alone mode. One or more sensors may monitor operation of the utility grid and provide a signal 67 to the inverter 60 corresponding to the status of the utility grid. The signal 67 may correspond, for example, to the voltage on one or more phases of the utility grid. Monitoring the input signal 67 from the grid allows the inverter to control the output signal 71 to a first state, either on or off, if the grid voltage is lost or unstable and control the output signal 71 to the other state, either off or on, when power has returned and stabilized on the grid. When reconnecting to the grid, the inverter 60 gradually synchronizes the voltage on the electrical connection 69 to a load with the magnitude and frequency of voltage present on the grid and controls the signal 71 to close the disconnect switch 70 once it is synchronized to the grid.

In operation, each of the power conversion devices is configured to operate independent of a system level controller. According to one embodiment of the invention, each of the converters 20, regulators 30, and inverters 60 regulate energy transfer between the common DC bus 50 and the source, storage device 40, or load to which they are connected as a function of the amplitude of the voltage present on the DC bus 50 and one or more setpoints stored in memory.

Figure 12:
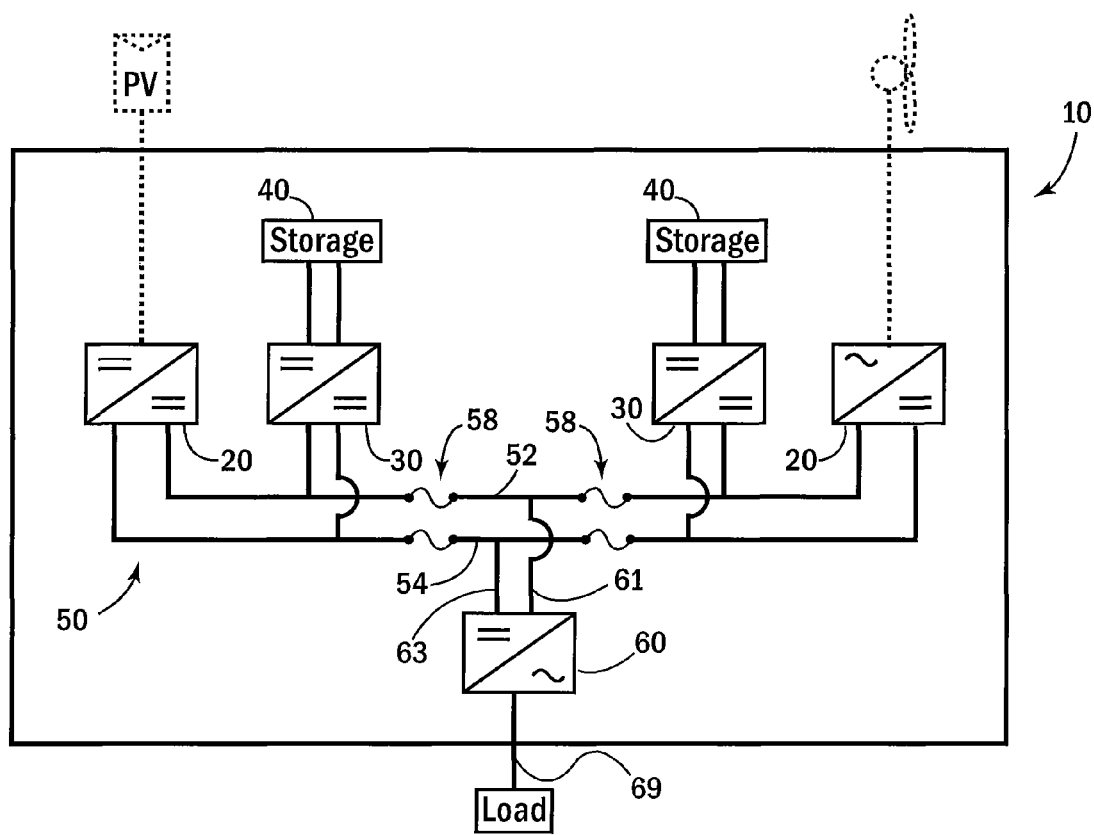
FIG. 12 is a schematic representation of another embodiment of the present invention illustrating exemplary generating sources and loads distributed along the DC bus.
Figure 14:
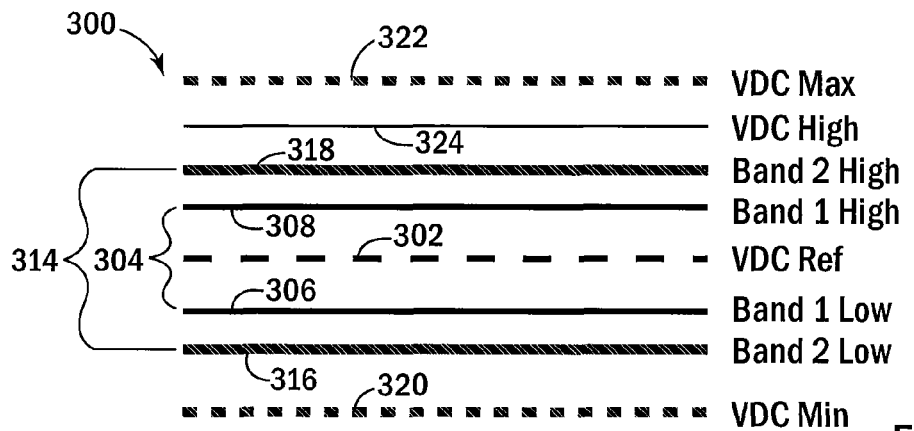
FIG. 14 is an illustration of converter and regulator control setpoints during operation according to one embodiment of the present invention.

According to one embodiment of the invention, a series of setpoints as illustrated in FIG. 14 may be used in cooperation with one of the systems 10 illustrated in FIGS. 11-13. The power system 10 includes at least one energy source connected to the DC bus 50 via a converter 20, at least two energy storage devices 40 connected to the DC bus 50 via separate regulators 30, and a load receiving energy from the DC bus 50 and/or the utility grid. A reference setpoint 302 defines a desired voltage level for the DC bus 50. Each of the regulators 30 includes a low voltage setpoint, 306 or 316, and a high voltage setpoint, 308 or 318, which define an acceptable band, 304 or 314, for the voltage level. If the amplitude of the voltage on the DC bus 50 remains within this band, the regulator 30 neither transfers energy to or from the DC bus 50. One of the regulators 30 includes a first low voltage setpoint 306 and a first high voltage setpoint 308, defining a first voltage band 304. Another of the regulators 30 includes a second low voltage setpoint 316 and a second high voltage setpoint 318, defining a second voltage band 314.

Figure 8:
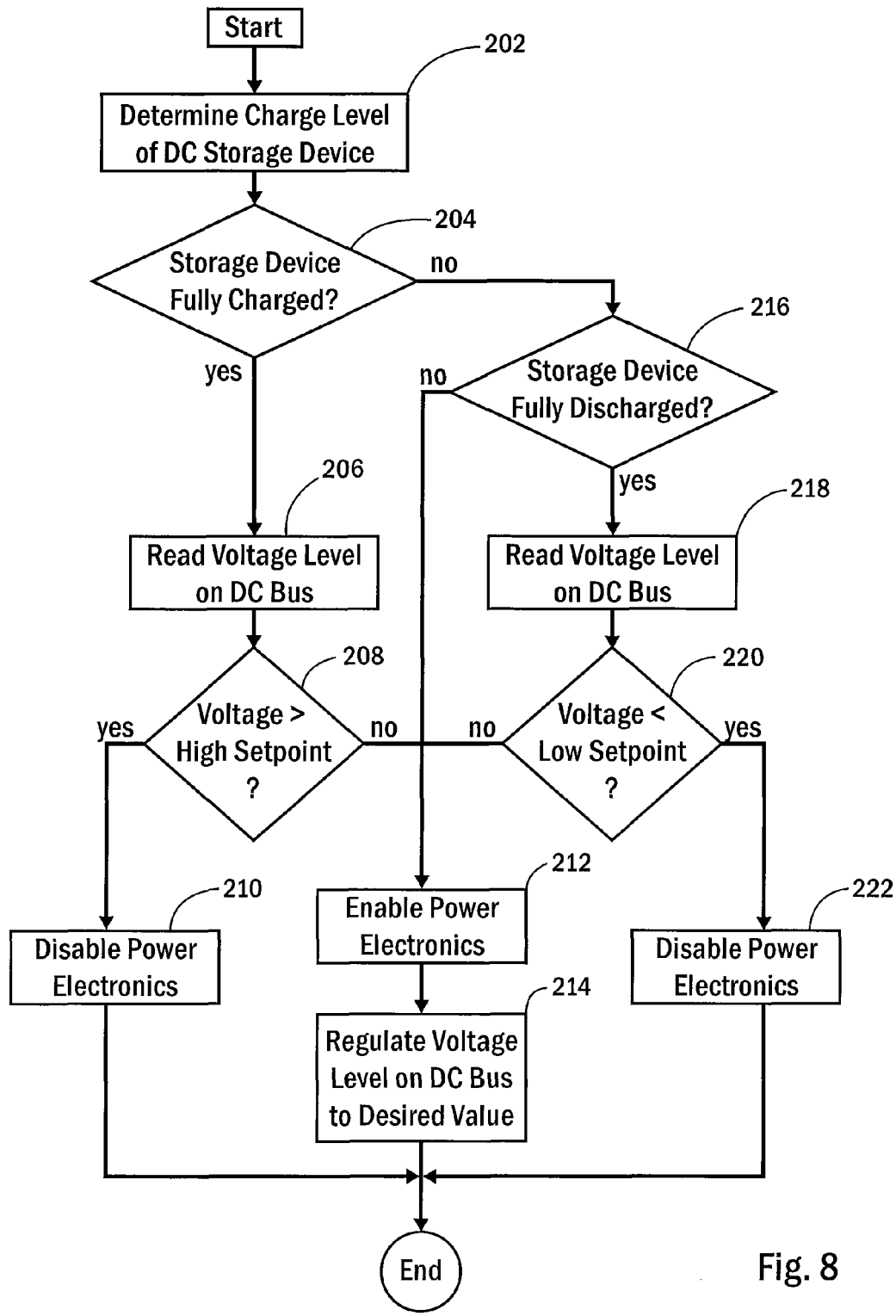
FIG. 8 is a flowchart of the operation of a regulator.

Each of the regulators 30 execute independently of the other regulators 30 to maintain the voltage level on the DC bus 50 at the reference setpoint 302. Referring also to FIG. 8, each regulator 30 monitors the level of charge in the corresponding storage device 40 at step 202. At step 204, the regulator 30 determines whether the storage device 40 is fully charged. If the storage device 40 is fully charged, it is unable to accept further energy from the DC bus 50. If the voltage level on the DC bus 50 exceeds the high voltage setpoint while the storage device 40 is fully charged, the power electronics 38 are disabled to prevent additional power flow to the storage device 40, as illustrated in steps 206, 208 and 210. However, if the voltage level on the DC bus 50 is less than the high voltage setpoint and the storage device 40 is fully charged, the power electronics 38 are enabled to allow transfer of energy from the storage device 40 to the DC bus 50 as required, as shown in steps 208, 212, and 214.

If the storage device 40 is not fully charged, the regulator 30 determines whether the storage device 40 is fully discharged at step 216. If the voltage level on the DC bus 50 drops below the low voltage setpoint while the storage device 40 is fully discharged, the power electronics 38 are disabled because the storage device 40 is unable to supply energy to the DC bus 50, as illustrated in steps 218, 220 and 222. However, if the voltage level on the DC bus 50 is greater than the low voltage setpoint and the storage device 40 is fully discharged, the power electronics 38 are enabled to allow transfer of energy from the DC bus 50 as required, as shown in steps 220, 212, and 214.

If the storage device 40 is neither fully charged nor fully discharged, the regulator 30 is enabled to manage energy transfer between the storage device 40 and the DC bus 50, as shown in steps 212 and 214. Each regulator 30 executes to maintain the DC voltage level within the voltage band stored in memory 34 as a function of the DC Bus voltage signal 36.

Referring again to FIG. 14, a first regulator 30 has a first voltage band 304 and a second regulator 30 has a second voltage band 314. If the DC Bus voltage signal 36 rises above the high voltage setpoint, 308 or 318, of one of the regulators 30 and if the corresponding energy storage device 40 has capacity, the regulator 30 executes to transfer energy from the common DC bus 50 to the corresponding energy storage device 40. If the DC Bus voltage signal 36 drops below the low voltage setpoint, 306 or 316, of one of the regulators 30 and if the corresponding energy storage device 40 has stored energy, the regulator 30 executes to transfer energy from the energy storage device 40 to the common DC bus 50. By setting the size of one of the voltage bands, 304 or 314, greater than the size of the other voltage band, 304 or 314, the power system 10 attempts to maintain the amplitude of the DC bus voltage within the first voltage band 304 using the first regulator 30 and its associated storage device 40. If the energy being generated by the sources or drawn by the loads exceeds the capacity of the first storage device 40, the second regulator 30 and its associated energy storage device 40 will then be utilized. Setting the voltage bands, 304 and 314, in this manner permits, for example, the use of energy storage devices 40 having different charge/discharge cycles or for identical energy storage devices 40, the different bands may ensure that a specific energy storage device 40 is utilized. Periodically, adjusting the voltage bands, 304 and 314, can vary the primary and secondary storage device 40.

The steps of FIG. 8 are repeated such that the regulator 30 is continuously monitoring the voltage on the DC bus 50 and responding appropriately. In this manner, the regulator 30 and storage device 40 operate to regulate the amplitude of the DC bus 50 within a desired band. The storage device 40 is preferably sized such that it generally remains in a partially charged state, receiving energy from the DC bus 50 when the generated power exceeds the demands from the loads and supplying energy to the DC bus 50 when the loads demand more energy than is provided by the generating sources.

Figure 7:
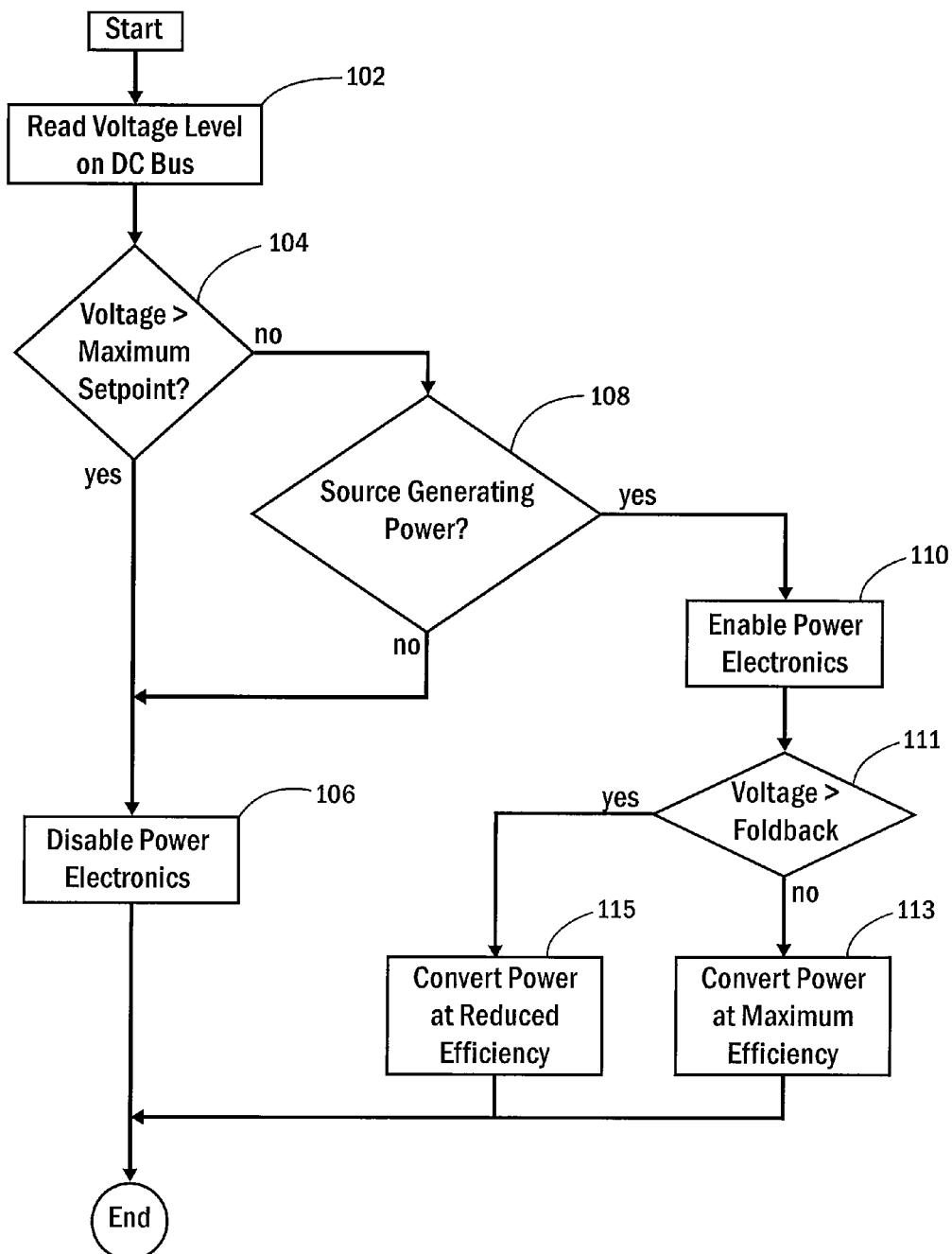
FIG. 7 is a flowchart of the operation of a converter.
Figure 16:
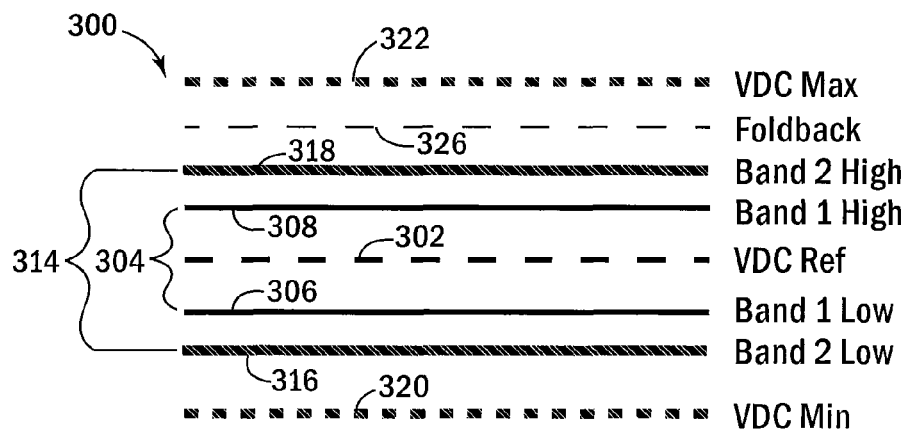
FIG. 16 is an illustration of converter and regulator control setpoints illustrating converter foldback according to the embodiment of the present invention in FIG. 14.

Each converter 20 operates independently of the other converters 20 and regulators 30 to supply power to the DC bus 50. Referring to FIGS. 7 and 16, operation of the converters 20 according to one embodiment of the invention is illustrated. At step 102, the converter 20 monitors the voltage signal 26 to determine an amplitude of the DC voltage present on the DC bus 50. In step 104, the voltage signal 26 is compared against a predetermined maximum voltage setpoint 322, for example 120%, of the reference voltage setpoint 302 for the DC bus voltage. If the voltage on the DC bus 50 rises above this maximum voltage setpoint 322, the converter 20 will disable the power electronics 28, according to step 106, in order to prevent further power from being input to the system. If the voltage on the DC bus 50 is below the maximum voltage setpoint 322, the converter 20 is ready to transfer energy from the generating source to the DC bus 50. In step 108, the converter 20 monitors the generating source to determine whether it is generating power. If no power is being generated, the power electronics 28, will be disabled, according to step 106, because there is no need to transfer power to the DC bus 50. If power is being generated, the converter 20 enables the power electronics 28 to transfer the energy from the source to the DC bus 50, according to step 110. At step 111, the converter 20 compares the amplitude of the voltage on the DC bus 50 to the foldback level 326. If the amplitude of the voltage on the DC bus 50 is less than the foldback level 326, energy is transferred at a maximum operating efficiency according to step 113. For example, a maximum power point tracking algorithm, as is known in the art, may be executed by the processor 22 in the control unit 25 to provide maximum power transfer from the source to the DC bus 50. However, if the amplitude of the voltage on the DC bus 50 is greater than the foldback level 326, energy is transferred at a reduced efficiency according to step 115. The efficiency may be reduced as a function of how much greater the amplitude of the voltage on the DC bus 50 is than the foldback level 326. The steps of FIG. 7 are repeated such that the converter 20 is continuously monitoring the amplitude of the voltage on the DC bus 50 and responding appropriately.

Figure 17:
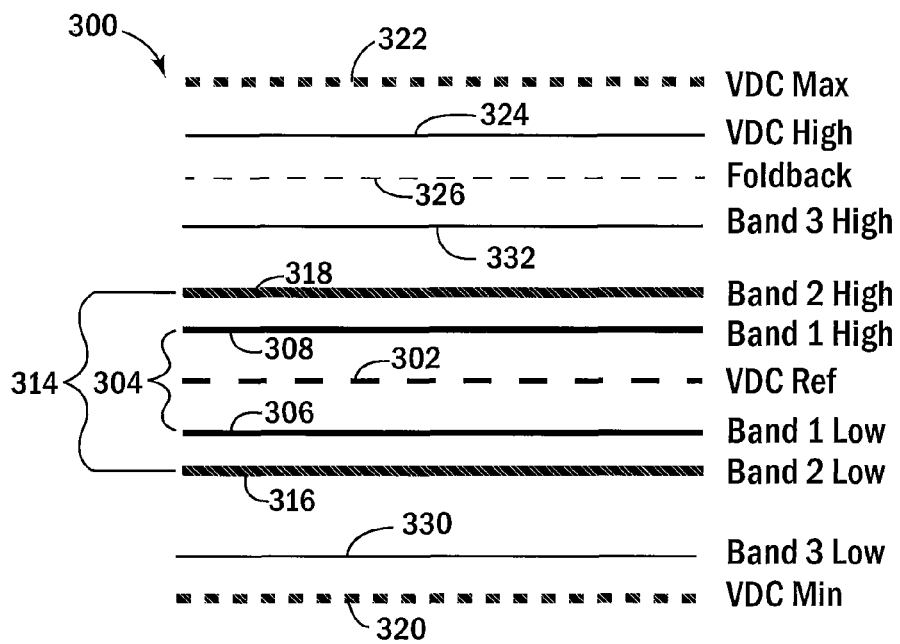
FIG. 17 is an illustration of converter and regulator control setpoints during operation according to another embodiment of the present invention.

The inverter 60 similarly operates independently of the other power conversion devices. When the power system 10 is connected to a grid-independent AC load, the inverter 60 transfers energy from the DC bus 50 to the AC load at a defined voltage and frequency according to the requirements of the AC load. When the power system 10 is connected to the utility grid, the inverter 60 synchronizes its output to the utility voltage and frequency. The inverter 60 controls power transfer either to or from the utility grid responsive to the voltage level on the DC bus 50. Referring also to FIG. 17, the inverter 60 includes setpoints to enable and disable energy transfer between the utility grid and the DC bus 50. For example a high voltage setpoint 332 and a low voltage setpoint 330 in the inverter may establish a third voltage band for interaction with the utility grid. If the DC bus voltage signal 66 is within this band, no energy transfer is required either to or from the utility grid. If the DC bus voltage signal 66 is greater than the high voltage setpoint 332, the inverter 60 transfers energy from the DC bus 50 to the utility grid. If the DC bus voltage signal 66 is less than the low voltage setpoint 330, the inverter 60 transfers energy from the utility grid to the DC bus 50. Alternately, the inverter 60 may remain enabled and transfer energy between the utility grid and the DC bus 50 as a function of the DC bus voltage signal 66 with respect to the reference voltage signal 302. It is further contemplated that the power system 10 may be configured to operate with no energy storage devices 40. Under such operation, the inverter voltage band may be used to maintain the voltage level on the DC bus 50. Thus, the grid connection can help maintain the DC bus 50 at the desired DC voltage level and can also provide another source of energy to charge storage devices 40 as provided in the power system 10.

Figure 18:
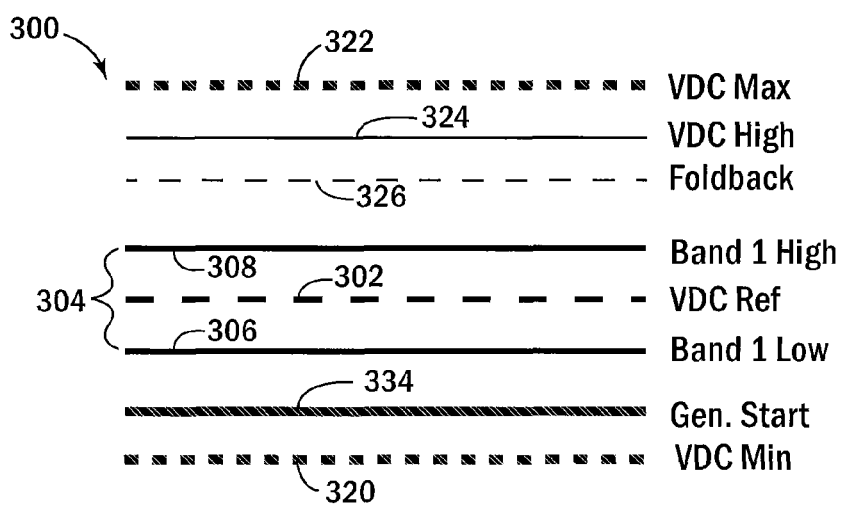
FIG. 18 is an illustration of converter and regulator control setpoints during operation according to another embodiment of the present invention.

Still other setpoints may be utilized to perform other functions within the power system 10. A minimum voltage setpoint 320 identifies the minimum amplitude of voltage present on the DC bus at which the power system 10 may continue to operate. Similarly, a maximum voltage setpoint 322 identifies the maximum amplitude of voltage present on the DC bus at which the power system 10 may continue to operate. If the amplitude of the voltage is either less than the minimum voltage setpoint 320 or greater than the maximum voltage setpoint 322, the power conversion device will be disabled and cease operation. A high voltage setpoint 324 identifies, for example, a voltage level above which a warning message may be posted. Numerous combinations of setpoints may be configured without deviating from the scope of the invention. For example, different power conversion devices in the power system 10 may have different minimum or maximum voltage setpoints, 320 and 322 respectively. Each of the converters 20 may have a lower maximum voltage setpoint 322 such that they stop supplying generated electricity to the DC bus 50 and permit the regulators 30 to continue to draw energy from and reduce the voltage level on the DC bus 50. Optionally, one converter 20 may have a lower maximum voltage setpoint 322 than another converter 20 such that one of the converters 20 stops transferring energy to the DC bus 50 at a first level and prevents further increase of the amplitude of the voltage on the DC bus 50. Referring also to FIG. 18, a generator start setpoint 334 may be provided in a converter 20 connected to a fuel-powered generator. If the DC bus voltage signal 26 is less than the generator start setpoint 334, a signal may be sent to the generator to start operation of the generator. When the generator reaches a stable operating point, the converter 20 transfers energy from the generator to the common DC bus 50. A second setpoint, not shown, or another signal within the convertor 20 may be used to disable the generator.

Figure 9:
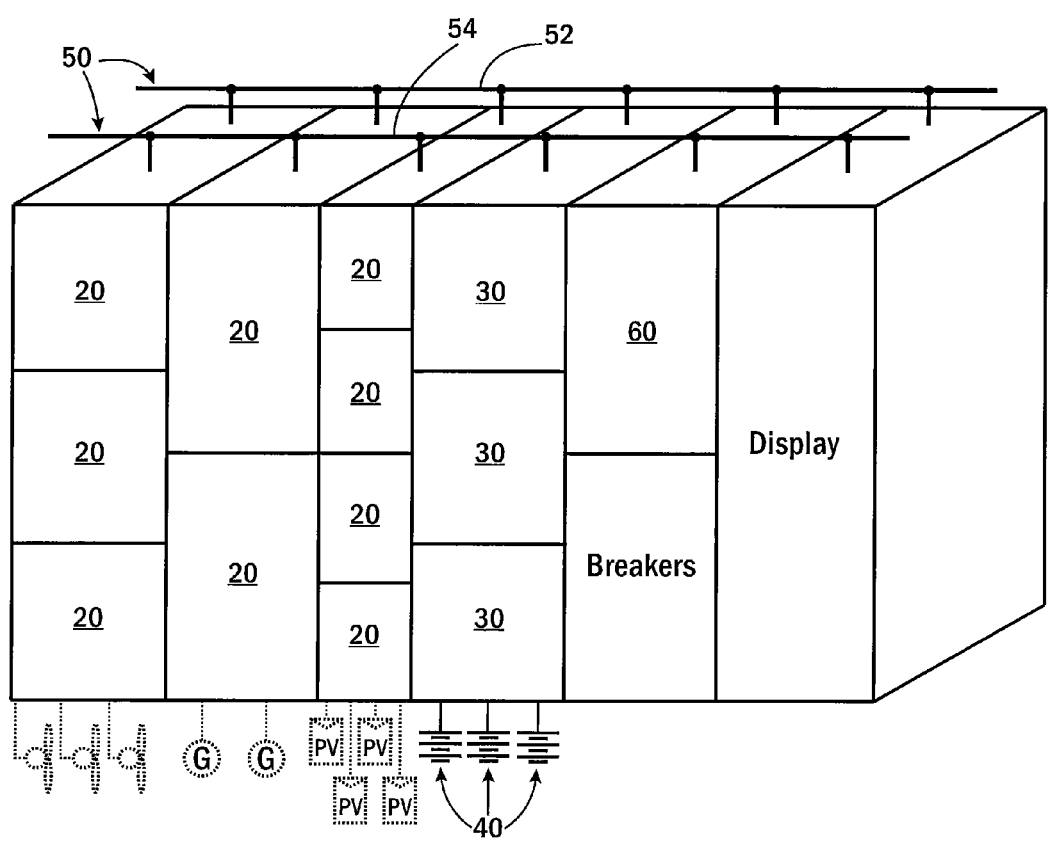
FIG. 9 is a schematic representation illustrating a modular rack implementation of the present invention.

The independent operation of each of the converters 20 and regulators 30 facilitates a modular construction of the power system 10. For example, each of the converters 20 and regulators 30 may be constructed as an individual module, as illustrated in FIG. 9. Each module may be of varying size depending on, for example, the power conversion capacity of the module and the power electronics requirements for the type of generating source. Preferably, each module is configured to be mounted to a common rack in any arrangement, but preferably in a series of columns. The DC bus 50 extends between modules. The converters 20 and regulators 30 are configured to connect to the DC bus 50 along one of the branches. Similarly, the inverter 60 is another module configured to be mounted on the common rack and connect to a branch of the DC bus 50. Other modules may be included as necessary (e.g., AC breakers between the inverter and the utility grid or a display panel) to similarly mount to the common rack and may or may not connect to DC bus 50 as needed. Each of the power conversion devices includes setpoints and a stored program to independently control energy transfer between the power conversion device and the DC bus 50 according to the application requirements.

Referring now to FIGS. 10, 11, and 13, the hybrid power system 10 may further include a central interface 80. According to one embodiment of the invention, the central interface 80 includes a display device and a user interface, including but not limited to, a keypad, a mouse, a touchpad, or a touchscreen. The central interface 80 may be located proximate to or incorporated within the hybrid power system 10. Optionally, the central interface 80 may be located remotely from the hybrid power system 10 and connected via any suitable wired or wireless network. The central interface 80 is also in communication with each of the power conversion devices in the hybrid power system 10 via a suitable network 82 including, for example, Ethernet, EthernetIP, or any other industrial communications network. The central interface 80 includes a memory device storing a copy of each of the setpoints within the power conversion devices. The user interface and display device permit a user to configure the setpoints and transmit new values for any of the setpoints to the power conversion devices via the network 82. If a new power conversion device is added to the power system 10, a user may enter values for any of the setpoints utilized by the power conversion device at the central interface 80. Optionally, a default set of values may be stored in the power conversion device and the central interface 80 may be configured to auto detect the device and upload the stored values.

The central interface 80 may further include a program configured to periodically execute on a processor within the central interface 80. Referring to FIG. 14, the program may, for example, be configured to periodically exchange the voltage setpoints of multiple regulators 30. If a power system 10 includes two or more regulators 30 and energy storage devices 40, it is possible that one of the regulators 30 and its associated storage device 40 may have a higher utilization rate than another regulator 30 and its associated storage device 40. Even if the setpoints in each regulator 30 are identical, manufacturing tolerances and offsets may cause one of the regulators 30 to begin transferring energy between the common DC bus 50 and the storage device 40 before another of the regulators. Thus, to provide more even utilization of the energy storage devices 40, the central interface 80 may be configured to periodically exchange the low voltage setpoint and the high voltage setpoint of a first energy regulator with the low voltage setpoint and the high voltage setpoint of a second energy regulator. Each energy storage device 40 will alternately be a primary or a secondary device to maintain the voltage level on the DC bus 50.

Figure 15:
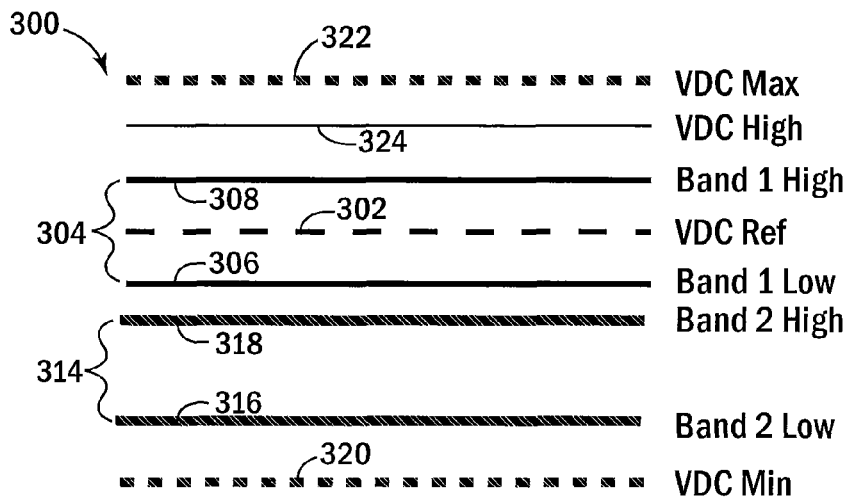
FIG. 15 is an illustration of converter and regulator control setpoints during a discharge cycle according to the embodiment of the present invention in FIG. 14.

Referring also to FIG. 15, it may be desirable to periodically fully charge or discharge the energy storage devices 40. To discharge one of the energy storage devices 40, the program on the central interface 80 may be configured to load a new value into each of the low voltage setpoint and the high voltage setpoint of a first of the energy regulators which is greater than the high voltage setpoint of at least one of the other energy regulators. The reconfigured regulator 30 will then begin transferring energy to the DC bus 50 from its associated energy storage device 40. A connected load may consume the energy or, if the energy being transferred exceeds the loads requirements, the remaining regulators 30 will transfer energy from the DC bus 50 to their associated energy storage devices 40. When the central interface 80 receives a signal corresponding to the energy storage device 40 being discharged, the value of each of the low voltage setpoint and the high voltage setpoint of the first energy regulator are reset to their original operating values. The program executing on the central interface 80 may similarly be configured to sequentially discharge one regulator 30 at a time such that the power system 10 remains operational while performing discharge cycles on each of the energy storage devices 40. Although two specific examples of utilizing the voltage bands have been discussed, namely to ensure even utilization of energy storage devices 40 and to sequentially discharge/charge energy storage devices 40, it is understood that numerous other configurations of the voltage bands may be configured to achieve other desired operating conditions.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A power control system for managing energy transfer, the power control system comprising:
   a common DC bus;
   a first electrical energy storage device operatively connected to the common DC bus;
   a second electrical energy storage device operatively connected to the common DC bus;
   a first electrical energy regulator having a first connection electrically coupled to the first electrical energy storage device and a second connection electrically coupled to the common DC bus;
   a second electrical energy regulator having a first connection electrically coupled to the second electrical energy storage device and a second connection electrically coupled to the common DC bus;
   wherein each of the first and the second electrical energy regulator further comprises:
   a plurality of switches, each switch selectively energized according to a switching signal, wherein the plurality of switches control energy transfer between the first and the second connections;
   a voltage signal corresponding to an amplitude of a DC voltage present on the common DC bus;
   a memory device storing at least a control program, a low voltage setpoint, and a high voltage setpoint; and
   a processor executing the control program to generate the switching signals for each of the plurality of switches as a function of the voltage signal, the low voltage setpoint, and the high voltage setpoint, wherein:
   energy is transferred from the common DC bus to the first electrical energy storage device if the voltage signal is greater than the high voltage setpoint of the first electrical energy regulator,
   energy is transferred from the first electrical energy storage device to the common DC bus if the voltage signal is less than the low voltage setpoint of the first electrical energy regulator,
   energy is transferred from the common DC bus to the second electrical energy storage device if the voltage signal is greater than the high voltage setpoint of the second electrical energy regulator,
   energy is transferred from the first electrical energy storage device to the common DC bus if the voltage signal is less than the low voltage setpoint of the second electrical energy regulator,
   at least one of the low voltage setpoint and the high voltage setpoint of the first electrical energy regulator is different than the corresponding low voltage setpoint and high voltage setpoint of the second electrical energy regulator.

2. The power control system of claim 1 wherein the first electrical energy storage device is selected from one of a battery, a flow battery, and a fuel cell and the second electrical energy storage device is selected from one of a battery, a flow battery, and a fuel cell, wherein the first energy storage device is different than the second energy storage device, and each of the low voltage setpoint and the high voltage setpoint for both the first energy regulator and the second energy regulator is a function of the selection of the first electrical energy storage device and the second electrical energy storage device, respectively.

3. The power control system of claim 1 further comprising a central controller in communication with each of the energy regulators having a processor configured to execute a stored program and a memory device storing at least the program and a copy of each of the voltage setpoints for the energy regulators.

4. The power control system of claim 3 further comprising:
   a first set of voltage setpoints, including a low voltage setpoint and a high voltage setpoint, stored in the memory device of the central controller;
   a second set of voltage setpoints, including a low voltage setpoint and a high voltage setpoint, stored in the memory device of the central controller, wherein the central controller is configured to execute in a first mode and a second mode, wherein:
   during the first mode the central controller sets the low voltage and high voltage setpoints of the first electrical energy regulator to the first set of voltage setpoints and the low voltage and high voltage setpoints of the second electrical energy regulator to the second set of voltage setpoints, during the second mode the central controller sets the low voltage and high voltage setpoints of the first electrical energy regulator to the second set of voltage setpoints and the low voltage and high voltage setpoints of the second electrical energy regulator to the first set of voltage setpoints, and the central controller periodically executes the stored program on the processor to switch between the first mode and the second mode.

5. The power control system of claim 3 further comprising:

a first set of voltage setpoints, including a low voltage setpoint and a high voltage setpoint, stored in the memory device of the central controller;

a second set of voltage setpoints, including a low voltage setpoint and a high voltage setpoint, stored in the memory device of the central controller;

a third set of voltage setpoints, including a low voltage setpoint and a high voltage setpoint, stored in the memory device of the central controller, wherein each of the low voltage setpoint and the high voltage setpoint for the third set of voltage setpoints is greater than the high voltage setpoint of both the first and second sets of voltage setpoints;

wherein the central controller is configured to execute in a first mode and a second mode, wherein:

during the first mode the central controller sets the low voltage and high voltage setpoints of the first electrical energy regulator to the first set of voltage setpoint and the low voltage and high voltage setpoints of the second electrical energy regulator to the second set of voltage setpoints, and during the second mode the central controller sets the low voltage and high voltage setpoints of one of the first electrical energy regulator and the second electrical energy regulator to the third set of voltage setpoints.

6. The power control system of claim 1 further comprising:

at least one energy converter having an input electrically coupled to a power generating source and an output electrically coupled to the common DC bus, each energy converter further comprising:

a plurality of switches, each switch selectively energized according to a switching signal, wherein the plurality of switches control energy transfer between the input and the output;

a voltage signal corresponding to the amplitude of the DC voltage present on the DC bus;

a memory device storing at least a control program and a mode select setpoint; and a processor executing the control program to generate the switching signals to transfer energy from the input to the output as a function of the voltage signal and the mode select setpoint.

7. The power control system of claim 6 wherein:

the control program stored on the memory device of each energy converter includes a first operating mode and a second operating mode, wherein the first operating mode transfers a maximum amount of energy generated by the source to the DC bus and the second operating mode reduces the amount of energy transferred between the source and the DC bus as a function of the DC voltage signal, the processor executes the control program in the first operating mode when the DC voltage signal is less than the mode select setpoint, and the processor executes the control program in the second operating mode when the DC voltage signal is greater than the mode select setpoint.

8. A method for managing energy transfer between a first electrical energy storage devices, a second electrical energy storage device, and a common DC bus using a first electrical energy regulator and a second electrical energy regulator, wherein the first electrical energy regulator has a first connection electrically coupled to the first electrical energy storage devices and a second connection electrically coupled to the common DC bus and the second electrical energy regulator has a first connection electrically coupled to the second electrical energy storage device and a second connection electrically coupled to the common DC bus, the method comprising the steps of:

receiving a signal corresponding to an amplitude of a DC voltage present on the common DC bus at a processor in each of the first and the second electrical energy regulators;

generating a switching signal for each of a plurality of switches in each of the first and the second electrical energy regulators with the processor as a function of the voltage signal, wherein the plurality of switches in each of the first and the second electrical energy regulators control energy transfer between the first connection and the second connection of the corresponding energy regulator;

transferring energy from the common DC bus to the first electrical energy storage devices via the first electrical energy regulator when the voltage signal is greater than a high voltage setpoint in the first electrical energy regulator;

transferring energy from the first electrical energy storage device to the common DC bus via the first electrical energy regulator when the voltage signal is less than a low voltage setpoint in the first electrical energy regulator;

transferring energy from the common DC bus to the second electrical energy storage device via the second electrical energy regulator when the voltage signal is greater than a high voltge setpoint in the second electrical energy regulator; and transferring energy from the second electrical energy storage device to the common DC bus via the second electrical energy regulator when the voltage signal is less than a low voltage setpoint in the second electrical energy regulator, wherein at least one of the low voltage setpoint and the high voltage setpoint of the first electrical energy regulator is different than the corresponding low voltage setpoint and high voltage setpoint of the second electrical energy regulator.

9. The method of claim 8 further comprising the steps of:

connecting at least one energy converter to the common DC bus, each energy converter having an input electrically coupled to a power generating source and an output electrically coupled to the common DC bus;

receiving a signal corresponding to the amplitude of the DC voltage present on the common DC bus at a processor in each energy converter;

transferring energy between the power generating source and the common DC bus in a first operating mode to transfer a maximum amount of energy generated by the power generating source to the DC bus when the DC voltage signal is less than a mode select setpoint; and transferring energy between the power generating source and the common DC bus in a second operating mode to transfer a portion of the energy generated by the power generating source to the DC bus when the DC voltage signal is greater than the mode select setpoint, wherein the portion decreases as the DC voltage signal increases above the mode select setpoint.

10. A method for managing energy transfer between a plurality of energy storage devices and a common DC bus using plurality energy regulators, wherein each energy regulator has a first connection electrically coupled to at least one of the energy storage devices and a second connection electrically coupled to the common DC bus, the method comprising the steps of:
configuring each of a low voltage setpoint and a high voltage setpoint in at least a first and a second energy regulator, wherein at least one of the low voltage setpoint and the high voltage setpoint of the first energy regulator is different than the respective low voltage setpoint or high voltage setpoint of the second energy regulator;
receiving a signal corresponding to an amplitude of a DC voltage present on the common DC bus at a processor in each energy regulator;
generating a switching signal for each of a plurality of switches in each energy regulator with the processor as a function of the voltage signal, wherein the plurality of switches in each energy regulator control energy transfer between the first connection the second connection of the corresponding energy regulator;
transferring energy from the common DC bus to the energy storage devices when the voltage signal is greater than the high voltage set point;
transferring energy from the energy storage device to the common DC bus when the voltage signal is less than the low voltage setpoint; and
exchanging, at a periodic interval, the low voltage setpoint and the high voltage setpoint of the first energy regulator with the low voltage setpoint and the high voltage setpoint of the second energy regulator.

11. A method for managing energy transfer between a plurality of energy storage devices and a common DC bus using a plurality of energy regulators, wherein each energy regulator has a first connection electrically coupled to at least one of the energy storage devices and a second connection electrically coupled to the common DC bus, the method comprising the steps of:
configuring each of a low voltage setpoint and a high voltage setpoint in at least a first and a second energy regulator, wherein at least one of the low voltage setpoint and the high voltage setpoint of the first energy regulator is different than the respective low voltage setpoint or high voltage setpoint of the second energy regulator;
receiving a signal corresponding to an amplitude of a DC voltage present on the common DC bus at a processor in each energy regulator;
generating a switching signal for each of a plurality of switches in each energy regulator with the processor as a function of the voltage signal, wherein the plurality of switches in each energy regulator control energy transfer between the first connection and the second connection of the corresponding energy regulator;
transferring energy from the common DC bus to the energy storage devices when the voltage signal is greater than the high voltage setpoint;
transferring energy from the energy storage devices to the common DC bus when the voltage signal is less than the low voltage setpoint; and
loading, at a periodic interval, a new value into each of the low voltage setpoint and the high voltage setpoint of a first of the energy regulators, wherein each of the new values is greater than the high voltage setpoint of at least one of the other energy regulators;
receiving a signal corresponding to a first energy storage device connected to the first energy regulator being discharged; and
resetting the value of each of the low voltage setpoint and the high voltage setpoint of the first energy regulator to their original operating value.

12. The method of claim 11 further comprising the initial step of scheduling each of the plurality of energy regulators to periodically execute the steps of claim 11 such that only one of the energy regulators executes the steps of claim 11 at a time.

* * * * *